United States Patent
Hsiao

(10) Patent No.: US 7,408,691 B2
(45) Date of Patent: Aug. 5, 2008

(54) VARIABLE APERTURE

(75) Inventor: Bor-Yuan Hsiao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/781,541

(22) Filed: Jul. 23, 2007

(65) Prior Publication Data

US 2008/0151346 A1    Jun. 26, 2008

(30) Foreign Application Priority Data

Dec. 20, 2006   (CN) .................... 2006 1 0157711

(51) Int. Cl.
*G02B 26/02* (2006.01)
(52) U.S. Cl. ...................... 359/228; 359/227
(58) Field of Classification Search ............... 359/208; 396/505–507
See application file for complete search history.

(56) References Cited

U.S. PATENT DOCUMENTS 5,181,016 A * 1/1993 Lee ........................ 345/84
5,302,988 A    4/1994 Nanjo
2005/0128370 A1 * 6/2005 Moon ..................... 349/32

* cited by examiner

*Primary Examiner*—James Phan

(57) ABSTRACT

A variable aperture includes a chamber, a transparent and electrically conductive aqueous solution, an opaque and electrically non-conductive oily solution, a transparent insulative and hydrophobic layer, a first electrode and a second electrode assembly. The chamber includes a first transparent portion and a second transparent portion located on opposite sides. The aqueous solution and the oily solution are contained in the chamber thus forming a contact interface therebetween. The transparent insulative and hydrophobic layer is arranged between the oily solution and the second transparent portion. The first electrode is arranged electrically contacting the aqueous solution. The second electrode assembly is arranged adjacent to the second transparent portion, and includes a transparent circular electrode and a plurality of concentric transparent annular electrode surrounding the transparent circular electrode, the circular electrode being insulated from the annular electrode.

9 Claims, 8 Drawing Sheets

VARIABLE APERTURE

TECHNICAL FIELD

The present invention relates to optical devices, and more particularly, to apertures for use in cameras.

BACKGROUND

With the ongoing development of micro-circuitry and multi-media technologies, digital cameras are now in widespread use. High-end portable electronic devices, such as mobile phones and PDAs (personal digital assistants), are being developed which are increasingly multi-functional. Therefore digital cameras now are popularly employed in portable electronic devices to allow the portable electronic devices to have an additional function of taking images and recording audiovisual information.

A typical digital camera includes a lens module for capturing optical information of an object and an image sensor for sensing the optical information captured by the lens module. Usually, an aperture is a necessary optical element in the lens module and is used for controlling an amount of light passing through the lens module. In FIGS. 6-8, a conventional mechanical aperture 100 is shown. The mechanical aperture 100 includes a number of arc laminas 110. The arc laminas 110 are movable so that a central through hole 120 having a predetermined diameter can be formed. The diameter of the central through hole 120 can be adjusted by moving the arc laminas 100 for controlling the amount of light passing through the aperture 100. However, the movement of the arc laminas 110 generally requires the assistance of a number of mechanical components, which renders the aperture 100 unduly bulky and therefore limits the application of lens module incorporating such an aperture 100 in a portable electronic devices.

What is needed, therefore, is an aperture with a compact configuration and a variable aperture size.

SUMMARY

A variable aperture in accordance with a preferred embodiment is provided. The variable aperture includes a chamber, a transparent and electrically conductive aqueous solution, an opaque and electrically non-conductive oily solution, a transparent insulative and hydrophobic layer, a first electrode, and a second electrode assembly. The chamber includes a first transparent portion and a second transparent portion opposite to the first transparent portion. The aqueous solution and the oily solution are contained in the chamber whereby a contact interface is formed therebetween. The transparent insulative and hydrophobic layer is arranged between the oily solution and the second transparent portion of the chamber. The first electrode is brought into electrically contact with the aqueous solution. The second electrode assembly is arranged adjacent to the second transparent portion of the chamber. The second electrode assembly includes a transparent circular electrode and a plurality of concentric transparent annular electrode surrounding the transparent circular electrode therein, the circular electrode being insulated from the annular electrode.

BRIEF DESCRIPTION OF THE DRAWINGS

Many aspects of the present variable aperture can be better understood by reference to the following description of embodiments thereof taken in conjunction with the accompanying drawings.

The exemplifications set out herein illustrate at least one preferred embodiment of the present variable aperture, in one form, and such exemplifications are not to be construed as limiting the scope of the variable aperture in any manner.

DETAILED DESCRIPTION OF PREFERRED EMBODIMENTS

Reference will now be made to the drawings to describe the preferred embodiments of the present variable aperture, in detail.

Figure 1:
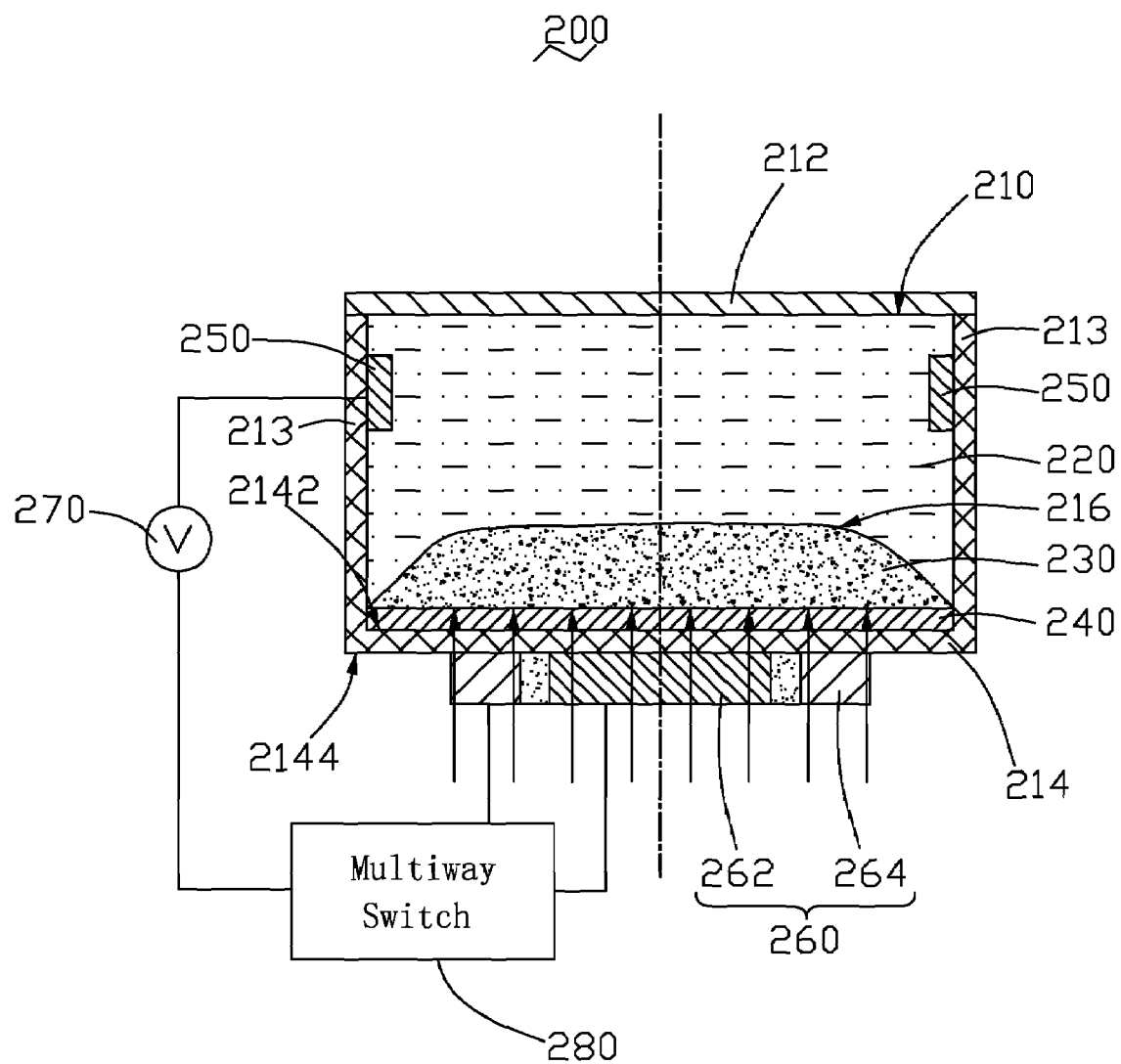
FIG. 1 is a schematic, cross-sectional view of a variable aperture in accordance with a preferred embodiment, the aperture including a first electrode and a second electrode assembly, and the second electrode assembly including a circular electrode and an annular electrode concentric with the circular electrode.

Referring to FIG. 1, a variable aperture 200, in accordance with a preferred embodiment, is provided. The variable aperture 200 includes a chamber 210, an electrically conductive aqueous solution 220, an opaque and electrically non-conductive oily solution 230, an insulative and hydrophobic layer 240, a first electrode 250, and a second electrode assembly 260. The chamber 210 may be sealed. The aqueous solution 220, the insulative and hydrophobic layer 240, the first electrode 250, and the second electrode assembly 260 each preferably is transparent or translucent, i.e., can transmit light.

The chamber 210 includes a first transparent/translucent portion 212, a second transparent/translucent portion 214 on an opposite side of the chamber 210 to the first transparent/translucent portion 212, and a sidewall 213 located between the first transparent/translucent portion 212 and the second transparent/translucent portion 214. In other words, the first transparent/translucent portion 212, the second transparent portion 214 and the sidewall 213 cooperatively define the chamber 210. The chamber 210 can be, e.g., a hollow cylinder or a hollow truncated cone, in shape. The first transparent/translucent portion 212 and the second transparent/translucent portion 214 act as one of an incident surface and an emitting surface of the variable aperture 200, respectively. Both the first transparent/translucent portion 212 and the second transparent/translucent portion 214 can be made of a material selected from the group consisting of glasses and plastics. The second transparent/translucent portion 214 has an inner surface 2142 and an outer surface 2144 opposite to the inner surface 2142. The inner surface 2142 advantageously is a hydrophobic surface.

The electrically conductive aqueous solution 220 and the opaque and electrically non-conductive oily solution 230 are contained in the chamber 210 and a contact interface 216 is defined between the aqueous solution 220 and the oily solution 230. The electrically conductive aqueous solution 220 can be a saline solution, such as a sodium chloride solution, a potassium chloride solution, a sodium sulfate solution, or a calcium chloride solution, and so on. The opaque and electrically non-conductive oily solution 230 can be comprised of black ink. Preferably, a density of the aqueous solution 220 is substantially equal or similar to that of the oily solution 230, in order to avoid mixing.

The insulative and hydrophobic layer 240 is, advantageously, formed between the opaque and electrically non-conductive oily solution 230 and the second transparent/translucent portion 214 of the chamber 210. Due to the hydrophobic nature of the hydrophobic layer 240, the aqueous solution 220 and the oily solution 230 can be stably kept at certain positions near the first transparent/translucent portion 212 and the second transparent/translucent portion 214, respectively.

The first electrode 250 is, advantageously, annularly disposed on an inner surface of the sidewall 213. The first electrode 250 electrically contacts with the electrically aqueous solution 220, and can be, beneficially, an electrically conductive coating deposited on the inner surface of the sidewall 213. The conductive coating can be deposited by a chemical vapor deposition method or a sputtering method.

Figure 2:
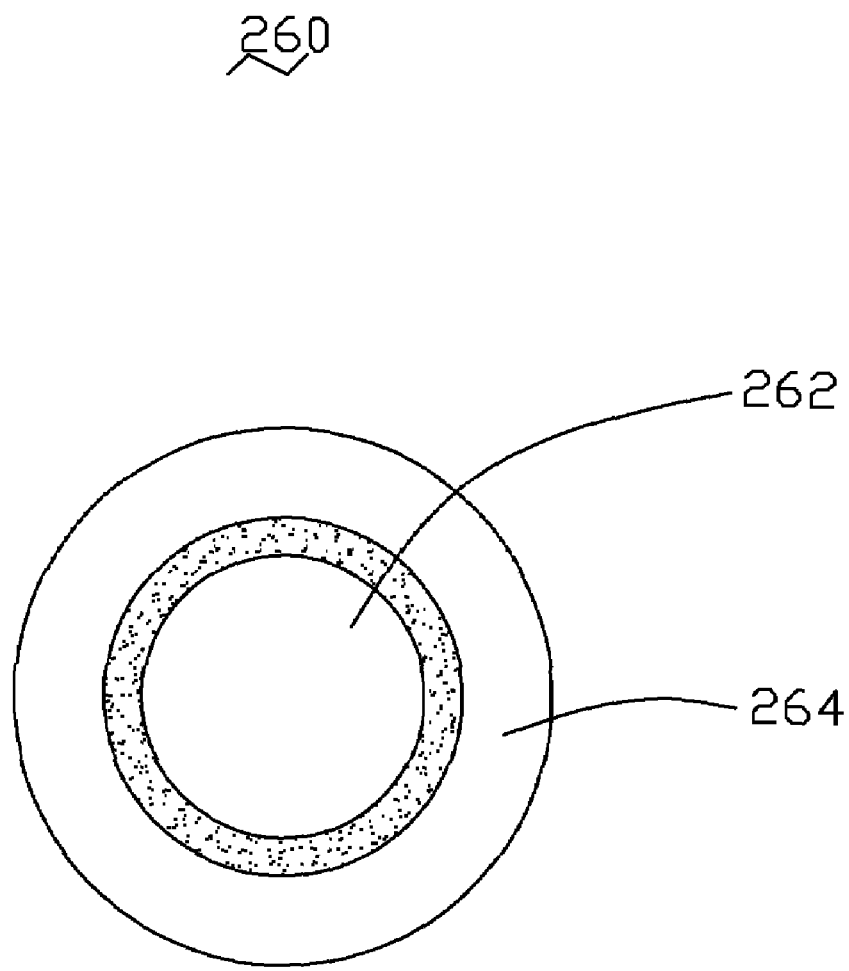
FIG. 2 is a schematic, bottom view of the second electrode assembly in FIG. 1.

The second electrode assembly 260 includes a transparent/translucent circular electrode 262 and a transparent/translucent annular electrode 264. The circular electrode 262 is position so as to be concentric with the annular electrode 264. Referring to FIG. 2, a space is defined between the circular electrode 262 and the annular electrode 264. The space can be filled with some transparent/translucent and insulative material such as plastic, thus forming an insulating intermediate layer. The second electrode assembly 260, in one embodiment, is disposed on the outer surface 2144 of the second transparent/translucent portion 214. Preferably, a central axis (as indicated by the dashed and dotted lines in FIG. 1) of the second electrode assembly 260 and a central axis of the chamber 210 should be essentially coaxial.

The variable aperture 200 further includes a voltage source 270. One terminal of the voltage source 270 is electrically connected with the first electrode 250, and the other terminal thereof is electrically connected with the circular electrode 262 and the annular electrode 264 of the second electrode assembly 260 via a multiway switch 280.

The operation principle of the present variable aperture 200 will be described as follows, in detail. Referring to FIG. 1 again, the opaque non-conductive oily solution 230 is uniformly distributed on a surface near the second transparent/translucent portion 214, of the insulative and hydrophobic layer 240 when no voltage (i.e., potential difference) is applied between the first electrode 250 and the second electrode assembly 260. The electrically aqueous solution 220 is excluded and is thus kept near the first transparent portion 212 of the chamber 210. Almost all of the light (shown by the arrow array in FIG. 1) cannot pass through the variable aperture 200, due to it being shaded by the opaque non-conductive oily solution 230. The aperture 200 has an aperture size essentially equal to zero in this state (hereinafter also referred to as "the first state").

Figure 3:
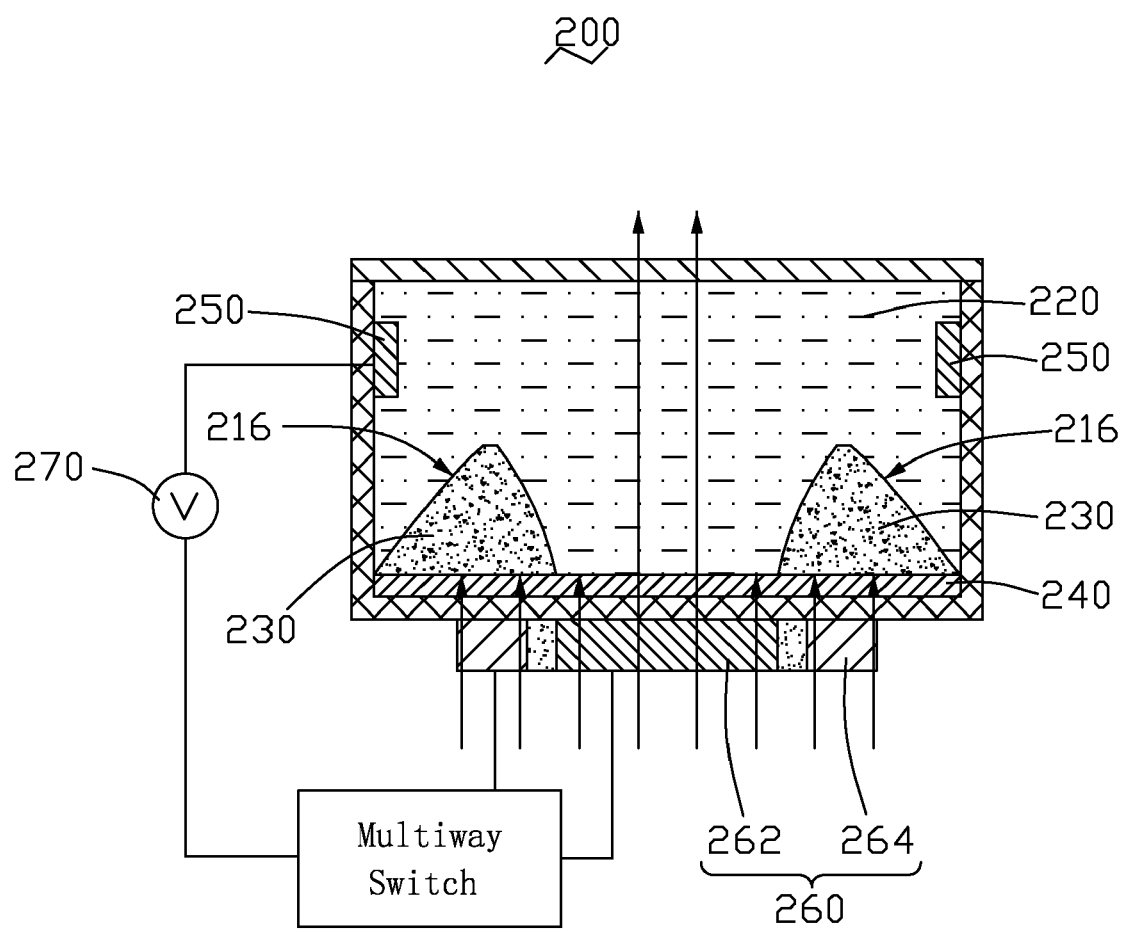
FIG. 3 is a schematic, cross-sectional view of the aperture of FIG. 1, after a voltage is applied between the first electrode and the circular electrode.

FIG. 3 illustrates an electrowetting effect generated in the variable aperture 200 when a voltage is applied between the first electrode 250 and the circular electrode 262 of the second electrode assembly 260. When a voltage is applied between the first electrode 250 and the circular electrode 262, an electric field is generated between the first electrode 250 and the circular electrode 262. Since the aqueous solution 220 is electrically connected to the first electrode 250, and is isolated from the second electrode assembly 260 via the insulative and hydrophobic layer 240, a voltage drop appears across the transparent insulative and hydrophobic layer 240 and the electrically conductive aqueous solution 220. This voltage drop electrostatically attracts the aqueous solution 220 towards the transparent insulative and hydrophobic layer 240 and thus causes the aqueous solution 220 to wet the insulative and hydrophobic layer 240 at the region corresponding to the circular electrode 262. Accordingly, the shape of the contact interface 216 is changed. As a result, the aperture 200 achieves an aperture size larger than that in the first state in this state (hereinafter also referred to as "the second state"). A part of the light can pass through a region of the aperture 200 corresponding to the location of the circular electrode 262 (as shown in FIG. 3).

When the voltage source 270 is shut off or disconnected from the first electrode 250 and the circular electrode 262, the contact interface 216 returns to its first state, as shown in FIG. 1. Correspondingly, the aperture size of the aperture 200 returns to essentially equal to zero. Therefore, the aperture size of the aperture 200 can be adjusted/switched by switching on/off the voltage source 270 electrically connected with the first electrode 250 and the circular electrode 262.

Figure 4:
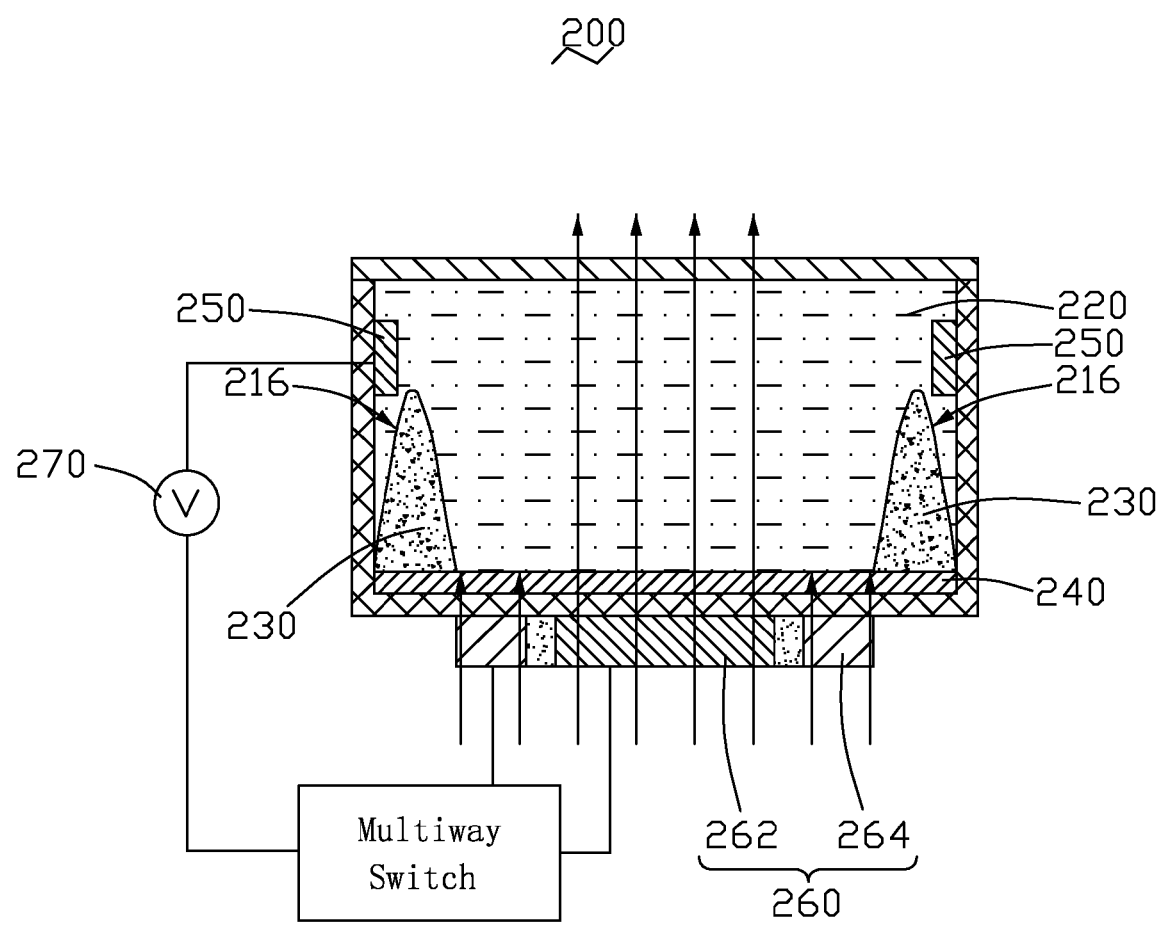
FIG. 4 is a schematic, cross-sectional view of the aperture of FIG. 1, after a voltage is applied between the first electrode and the second electrode assembly including the circular electrode and the annular electrode.

FIG. 4 illustrates a third state of the variable aperture 200 when a voltage is applied between the first electrode 250, the circular electrode 262 and the annular electrode 264 of the second electrode assembly 260. Similar to the second state as above described, an electrowetting effect occurs in the aperture 200 and causes the aqueous solution 220 to wet the transparent insulative and hydrophobic layer 240 at the region corresponding to the circular electrode 262 and the annular electrode 264. Accordingly, the shape of the contact interface 216 is further changed. As a result, the aperture size of the aperture 200 becomes larger than that in the second state and thus more light can pass through the aperture 200.

It will be understood that the second electrode assembly 260 can include more than one transparent/translucent annular electrodes arranged concentrically with the transparent circular electrode 262, so as to extend the variable range of the aperture size of the aperture 200.

Figure 5:
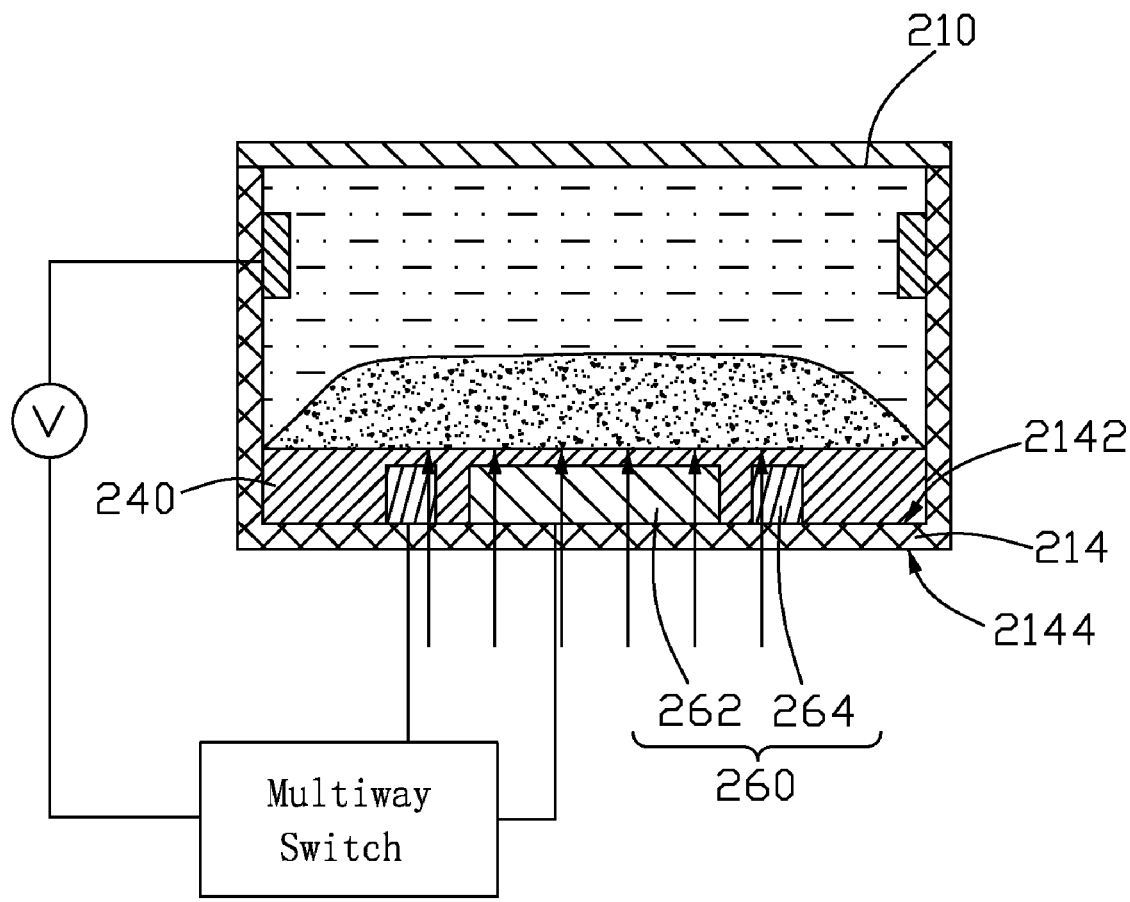
FIG. 5 is a schematic, cross-sectional view of a variable aperture, in accordance with another preferred embodiment.
Figure 6:
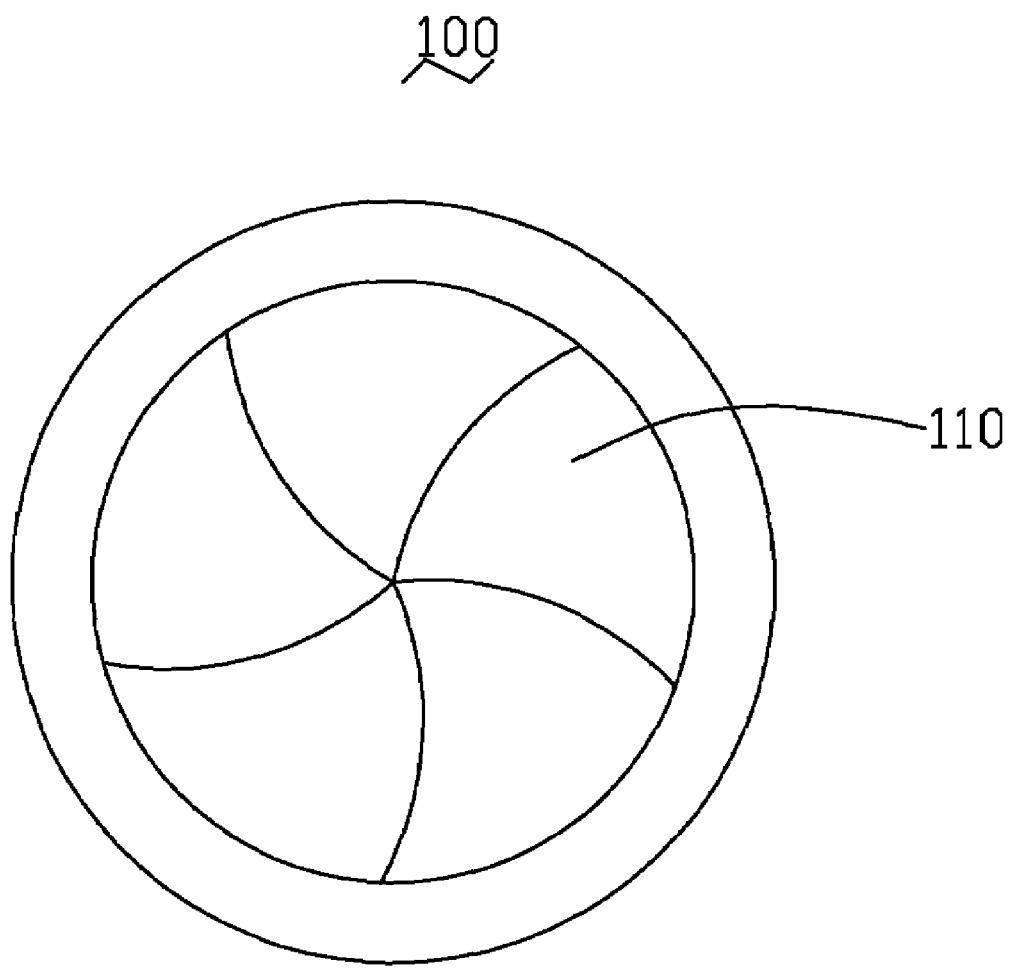
FIGS. 6 to 8 are schematic, top views of a typical mechanical aperture in different operation states, in association with the related art.
Figure 7:
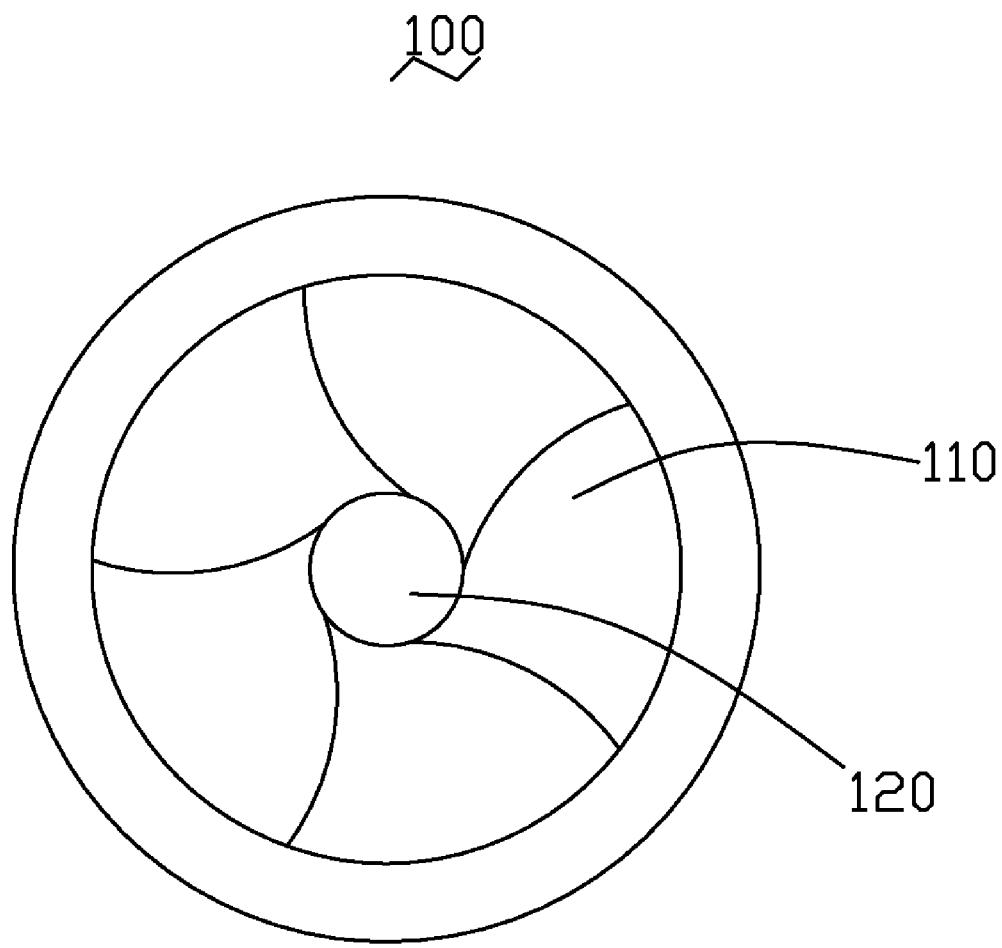
Figure 8:
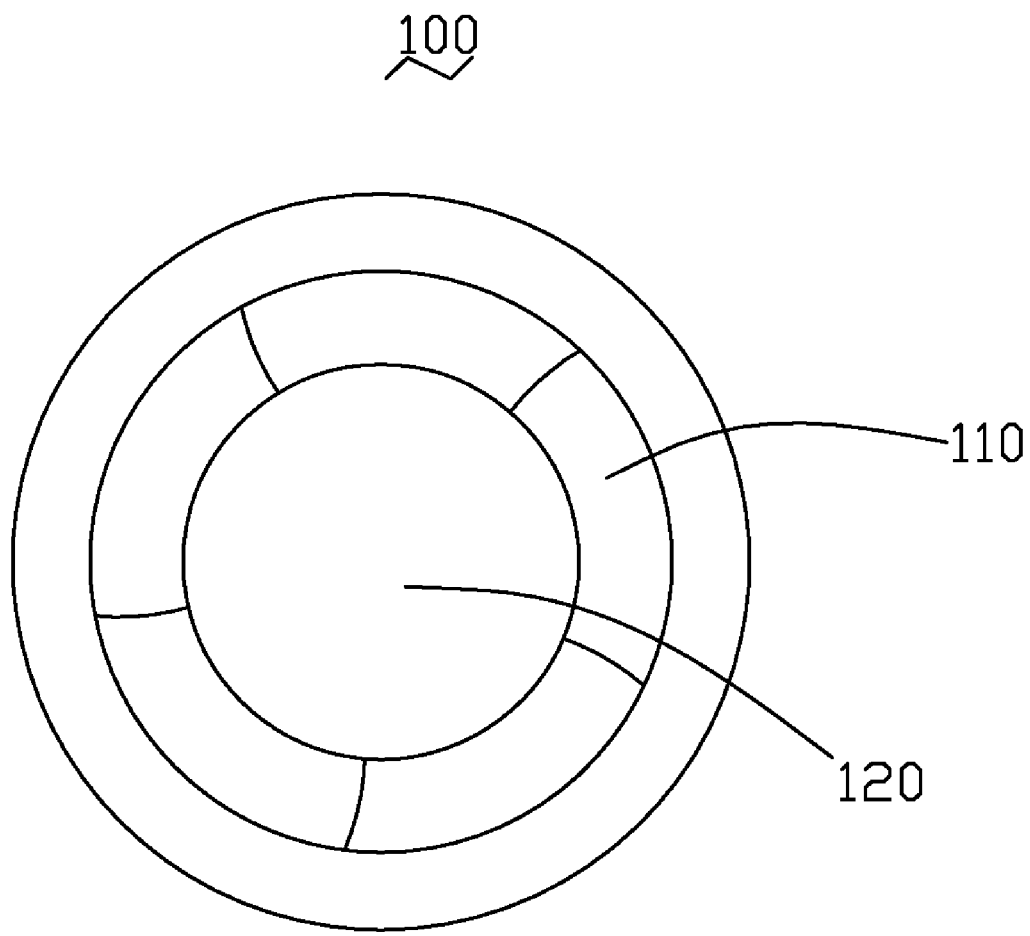

FIG. 5 illustrates another variable aperture 300, in accordance with another preferred embodiment. The variable aperture 300 is essentially similar to the variable aperture 200 except with respect to the position of the second electrode assembly 260. In this embodiment, the second electrode assembly 260 is disposed on the inner surface 2142 of the second transparent portion 214 of the chamber 210. Correspondingly, a transparent insulative and hydrophobic layer 240 is formed on a surface removed from (i.e., not contacting) the second transparent portion 214 of the second electrode assembly 260. In this embodiment, an effect similar to that of the previously described embodiment can be obtained. When a voltage is applied between the first electrode 250 and the second electrode assembly 260 (i.e., the circular electrode 262 and/or the annular electrode 264), an electrowetting effect will occur in the aperture 300 so as to change the shape of the contact interface 216, thus allowing adjusting of the aperture size of the aperture 300.

An advantage of the variable apertures 200, 300 is that the aperture sizes of the variable apertures 200, 300 can be readily adjusted by way of simply applying a voltage between the first electrode 250 and the second electrode assembly 260. As such, a variable aperture with a compact configuration and a variable aperture size is achievable.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A variable aperture, comprising:
   a chamber including a first transparent portion and a second transparent portion on an opposite side of the chamber to the first transparent portion;
   a transparent and electrically conductive aqueous solution contained in the chamber;
   an opaque and electrically non-conductive oily solution contained in the chamber, the oily solution and the aqueous solution cooperatively forming a contact interface therebetween;
   a transparent insulative and hydrophobic layer arranged between the oily solution and the second transparent portion of the chamber;
   a first electrode brought into electrically contact with the aqueous solution; and
   a second electrode assembly arranged adjacent to the second transparent portion of the chamber, the second electrode assembly including a transparent circular electrode and a concentric transparent annular electrode surrounding the transparent circular electrode therein, the circular electrode being insulated from the annular electrode;
   a voltage supply having a first output terminal electrically connected to the first electrode, and a second output terminal for being selectively connected to at least one of the transparent circular electrode and the transparent annular electrode of the second electrode assembly.

2. The variable aperture as claimed in claim 1, wherein a density of the transparent and electrically conductive aqueous solution is substantially equal to that of the opaque and electrically non-conductive oily solution.

3. The variable aperture as claimed in claim 1, wherein the transparent and electrically conductive aqueous solution is a saline solution, and the opaque and electrically non-conductive oily solution is comprised of black ink.

4. The variable aperture as claimed in claim 1, wherein the second electrode assembly is disposed on an inner surface of the second transparent portion.

5. The variable aperture as claimed in claim 1, further comprising a multiway switch for selective connection of the voltage source to at least one of the transparent circular electrode and the transparent annular electrode of the second electrode assembly.

6. The variable aperture as claimed in claim 1, wherein the chamber has a cylindrical configuration or a truncated conical configuration.

7. The variable aperture as claimed in claim 6, wherein the second electrode assembly is coaxially aligned with the chamber.

8. The variable aperture as claimed in claim 1, wherein the first transparent portion is made of a material selected from the group consisting of glasses and plastics.

9. The variable aperture as claimed in claim 1, wherein the second transparent portion is made of a material selected from the group consisting of glasses and plastics.

* * * * *